Jan. 8, 1963    J. S. WHEELER, JR    3,072,141
VALVE
Filed April 15, 1960    2 Sheets-Sheet 1
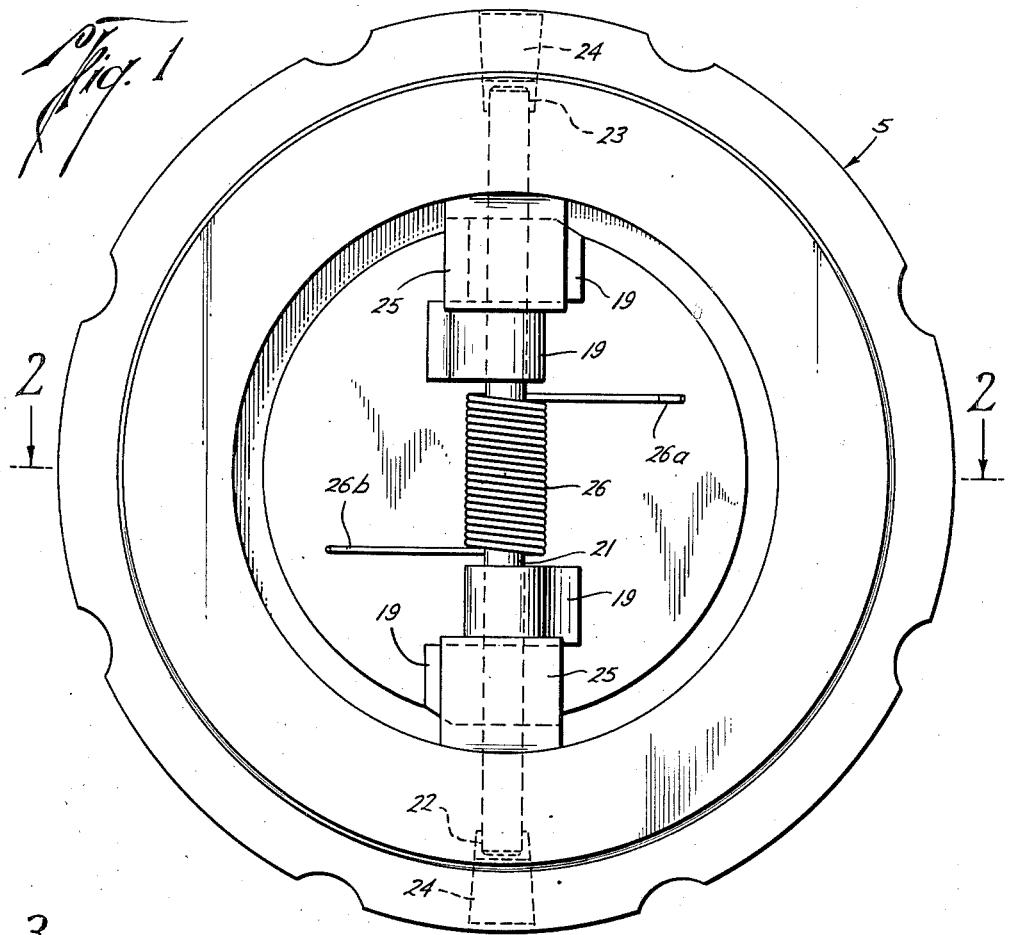
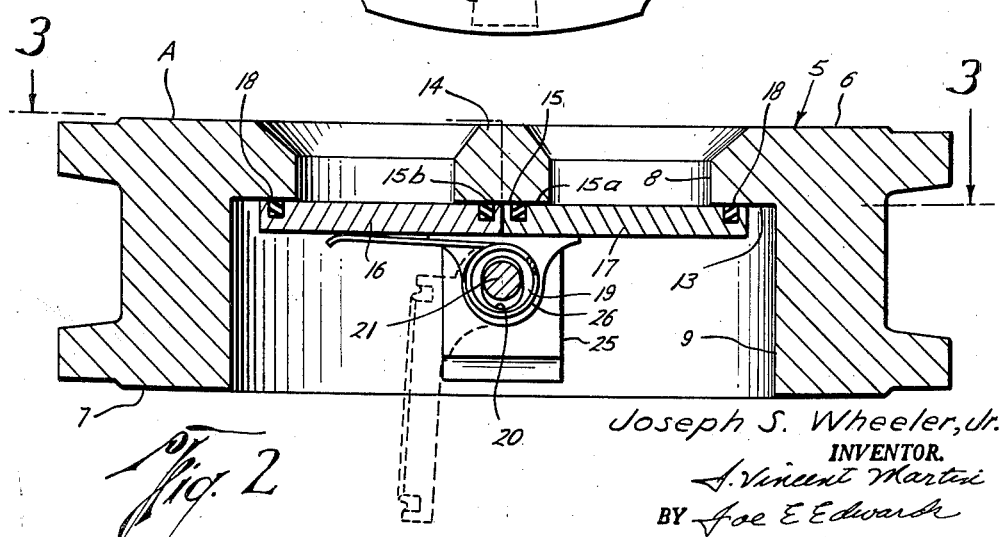
Joseph S. Wheeler, Jr.
INVENTOR.
BY
ATTORNEYS

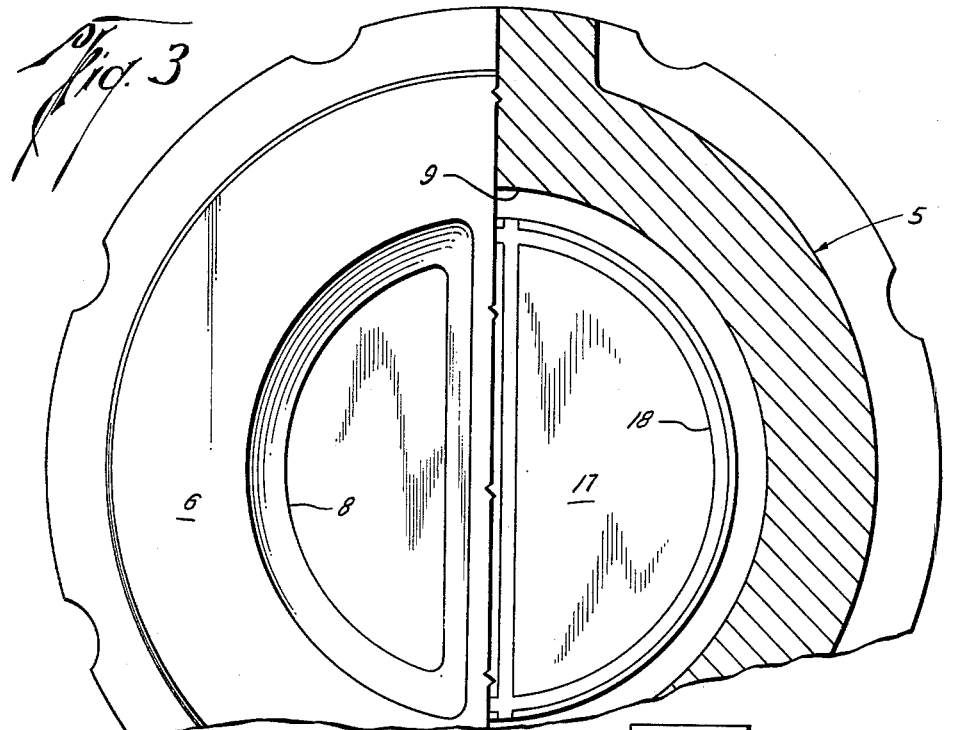
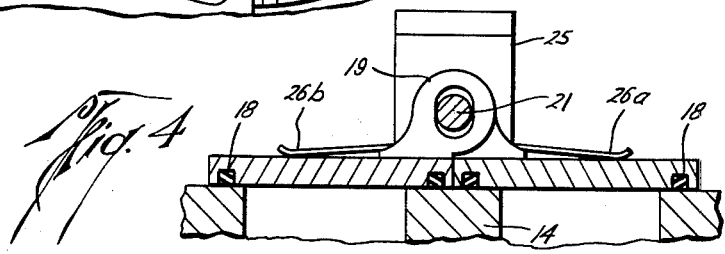
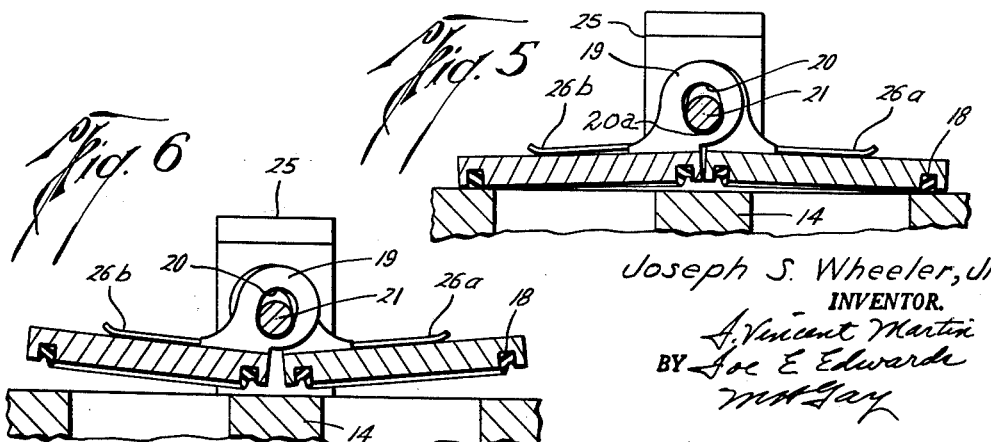
Joseph S. Wheeler, Jr.
INVENTOR.

United States Patent Office 3,072,141
Patented Jan. 8, 1963

3,072,141
VALVE
Joseph S. Wheeler, Jr., Houston, Tex., assignor to Mission Valve and Pump Company, Houston, Tex., a corporation of Texas
Filed Apr. 15, 1960, Ser. No. 22,474
8 Claims. (Cl. 137—512.1)

This invention relates to a new and useful improvement in valves. More specifically, it relates to a flapper type check valve.

In flapper type valves of the type illustrated in this application, wear of the valve member occurs adjacent the hinge due to the large lateral component of movement of this portion of the valve member when in the almost closed position. This wear characteristic is particularly objectionable when compression type resilient seals are employed as the seals expand as pressure is reduced and wear over a relatively large arc of travel of the valve member occurs.

It is an object of this invention to provide a check valve of the flapper type in which the pivoting side of the valve flapper plate lifts free of its seat before opening, thereby protecting the sealing surfaces from wear.

Another object is to provide a check valve in which the valve flapper plate has a floating pivotal mounting and a force-applying closing means so arranged with respect to each other that on fluid pressure being applied to the upstream face of the plate, the pivoting side of the plate will initially lift free of its seat prior to its pivoting movement to a fully open position; thus avoiding any sliding or binding between sealing surfaces.

Another object is to provide an improved assembly in which flexible or elastic sealing elements are employed on the valve plate and in which undue wear of said sealing element, which normally results from a sliding action against the element during opening and closing of the valve, is obviated.

Other objects and advantages will be apparent from the detailed description in the following specification which is illustrated by the drawings, wherein:

FIGURE 1 is an end view of the downstream side of the valve assembly;

FIGURE 2 is a view taken on lines 2—2 of FIGURE 1;

FIGURE 3 is a fragmentary view taken on lines 3—3 of FIGURE 2;

FIGURE 4 illustrates the valve in closed position;

FIGURE 5 illustrates the valve with the valve member beginning to open;

FIGURE 6 illustartes the valve moving toward fully open position from the FIGURE 5 position.

In the drawings the letter A designates a valve assembly including an annular valve body 5 having seating surfaces 6 and 7 on its ends for engaging and sealing with seating surfaces of conventional coupling flanges in pipe-lines. This body has a bore 8 and a counterbore 9 to form an annular shoulder or seating surface 13 within the body.

A transverse rib 14 preferably integral with the body extends diametrically across and divides the bore into two semi-circular passages. One surface 15 of the rib 14 lies in the same plane as the shoulder or seating surface 13, and each half portion 15a and 15b of said rib surface co-acts with substantially one-half of the annular seating surface 13 to provide a valve seat surrounding each passage.

Two flat semi-circular plates or half discs comprise the flappers or valve members 16 and 17 within the main body. Each of these valve members is identical with the other and it is believed that a description of one will suffice. Each plate is somewhat larger than the passage which it closes so that the outer marginal portion of the plate overlaps and engages substantially one-half of the inner surface of the rib 14 and that part of seating surface 13 which surrounds said passage. When both valve members are in seated position engaging their respective seats, said valve members lie with their straight sides back to back and with their semi-circular extremities forming a completed circle. A resilient seal 18 best seen in the cross-sectional view of FIGURE 3, is indicated as extending around the marginal portion of the sealing surface on each valve plate, being located a short distance inwardly from its edge. This seal may be of rubber, or of other natural or compounded elastic composition, such as is commonly used in seals of this type. The seal may also be partially contained in a groove, as shown, to secured it firmly to the face of the closure. The seal is preferably bonded in place. A seal of this type may be provided in the valve seats instead of being on the valve members, if desired.

Each valve member has two hinge members 19 extending outwardly from the downstream face on the member and preferably integral therewith. Preferably the hinges are on the sides of the valve members opposite the seat to permit the valve members to lie adjacent each other, thus reducing the size of the valve body. As shown in FIGURE 2, each hinge member has a hole 20 extending therethrough which is elongated with the elongated dimension disposed at a right angle with respect to the plane of the valve seat to allow the plate to float or translate within the limits of this elongation.

The valve plates are hinged within the main body on a shaft or axis 21 which extends through the elongate holes in the hinge members, and has its ends journalled at 22 and 23 in the main body so that it lies adjacent and parallel to the rib 14. This shaft is held in place by screw plugs 24 in the outer portion of the journal. This shaft is loosely engaged within each hinge member as shown in FIGURE 2 in the direction of the elongated hole allowing free play in that direction. It would also be possible, alternatively, to have the elongations in the journal, rather than in the hinge members.

If desired, stops 25 may be provided on the shaft to prevent the closures from coming into full engagement with each other when fully opened so as to insure that they will close upon reversal of line pressure.

Important to this invention is the provision of a closing means which will allow the valve member to pivot open only after the valve member has lifted off its seat in the area of the hinges, thus avoiding wear to the resilient seal along this side of the valve member.

A preferred device for urging the valve members toward their seated positions, consists of a helical spring 26 wound upon shaft 21 along its middle section. The ends 26a and 26b of the spring contact the valve member and exert a force at a point here expressed as being in the outer area of the valve member.

This outer area may be defined as being the outer one-half, approximately, of the surface of the valve member exposed to upstream pressure when the valve members are seated, that is, the area remote from the hinges.

This spring, or other resilient tension or torsion means, thus applies force to this outer portion of the valve closure urging it closed. When fluid in the line in which this valve assembly is mounted exerts a greater force on the opposite or upstream side of the valve closure, each valve member tends initially to lift off of its seat along the hinged side of the plate to the extent allowed by the elongate holes in the hinge members, before pivoting about the hinges to a fully open position. The ends 26a and 26b of the spring, therefore, serve to force the valve members to counter-pivot slightly about the extremity of the valve member remote from the hinges before swinging or pivoting into open position. It is important for this reason ot have the holes through the hinges elongate perpendicular to the face of the valve plate, and force application such as a spring or its equivalent providing a pressure point in the outer half of the plate area. This arrangement substantially eliminates wear on the resilient seals 18.

Obviously, if a resilient seal such as illustrated is employed on the plate surface, this seal though somewhat compressed when the plate is closed, expands slightly as the fluid in the line begins to open this plate. If the plate cannot float within its hinges, the seal must slide across the seal face on the rib and soon wears considerably.

The operation of this valve, as diagrammatically shown in FIGURES 4 through 6, shows how this wear is obviated, by providing a floating plate structure combined with a spring in the outer area of the plate.

FIGURE 4 shows the valve members having seals 18 in contact with the face of the rib 14. In this position the entire valve member is seated, being held in place by springs at points 26a and 26b.

In FIGURE 5, as fluid begins to exert pressure against the opposite or upstream face of valve members 16 and 17, the initial movement is a lifting one at the straight side of the valve member due to the spring contact holding the curved portions of the valve members in contact with the seat 13. The valve members, however, are no longer in contact with the rib. As the hinge lifts outwardly against the shaft, the shaft now holds the valve members within the end of the elongate opening 20a. The seals expand outwardly from the surface of the valve members, but preferably do not touch the sealing surface of the rib.

Once lifted off the rib portions of their seats, FIGURE 6 indicates that the valve members are free to swing clear of the seat without the seal rubbing or sliding against it.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. A valve comprising an annular body having a seating face at each extremity adapted to be clamped between adjacent coupling flanges of a pipeline, said body including a rib extending diametrically across the body dividing said body into two sections, there being a flow passage in the body on one side of said rib, and a flow passage in the body on the other side of said rib, a valve seat in the body extending around each of said passages, said valve seats provided in part by seat surfaces on said rib, said valve seats being disposed between the ends of the body and both facing the same one of the ends thereof and spaced therefrom, a pair of valve members each having the shape of a half disk, resilient seal means on one of said seat and members for seating therebetween, a shaft across said body adjacent and parallel to said rib, hinges on said valve members on the side opposite said valve seat for mounting each valve member for pivotal motion about said shaft parallel to said rib between a closed position in which the valve members are closely adjacent each other and engage said seats and an open position in which the valve member is out of full engagement with its seat, said shaft overlying said disc and seat at least in part in a plane parallel with the central axis of the passage when said disc is seated, said hinges having a hole therethrough elongate perpendicular to the plane of its valve member for accommodating said shaft in loose engagement to the extent of the elongation, force applying means on said shaft contacting said valve members at points in the outer half of the area of said valve members opposite said shaft urging said valve members toward a closed position and spaced from each valve member in the other half of the area of each valve member when the valve member is seated, whereby the valve members float on said shaft on pressure being applied to the opposite face of the valve member, in such a way that the valve members lift free of their seats in the area adjacent the hinges prior to pivoting open.

2. The valve in claim 1 in which the force applying means is a helical spring wound upon the shaft, the ends of said spring contacting the valve members at a point in the outer half of the area of said valve members opposite said shaft urging them toward a closed position.

3. A valve comprising a body, a passage therethrough, a valve seat within the body surrounding the passage, a valve member for engaging said valve seat to close off said passage, a resilient seal on one of said seat and member engageable between said seat and member, a shaft for pivotally supporting said valve member within the body, means securing the shaft within said body, a hinge for supporting said valve member on said shaft, said shaft overlying said valve member and seat at least in part in a plane parallel to the central axis of the passage when said valve member is seated, said hinge having a hole therethrough elongate at right angles to the plane surface of the valve member for accommodating said shaft in loose engagement to the extent of the elongation, said shaft extending through said hole, and resilient means bearing against said valve member at a point in the outer half of the area opposite said shaft and spaced from each valve member in the other half of its area when said member is seated for urging said valve member toward a closed position.

4. A valve comprising a body, a passage therethrough, a valve seat within the body surrounding the passage, a valve member for engaging said valve seat to close off said passage, a resilient seal on one of said seat and member engageable between the valve seat and the valve member, a shaft pivotally supporting said valve member within the body, and means securing the shaft within said body, a hinge supporting said valve member on said shaft, said shaft overlying said valve member and seat at least in part in a plane parallel to the central axis of the passage when said valve member is seated, said hinge having a hole therethrough elongate at right angles to the plane surface of the valve member for accommodating said shaft in loose engagement to the extent of the elongation, said shaft extending through said hole, and a helical spring wound upon said shaft said spring having one end in contact with said valve member at a point on the closure in the outer half of the area opposite said shaft and spaced from said valve member in the other half of its area when the valve member is seated for urging the valve member toward a closed position.

5. A valve comprising a body having a passage therethrough, a valve seat within said body, a valve member adapted to engage said seat when in closed relationship, a resilient seal on one of said seat and member engageable between said seat and member, a hinge member for said valve member, said hinge member having a hole therethrough elongate perpendicular to the plane of the valve member, a shaft through the elongate hole supporting said hinges and in loose engagement therein to the extent of the elongation, said shaft overlying said valve member and seat at least in part in a plane parallel to the central axis of the passage when said valve member is seated, and means urging said valve member toward a closed position at a point on the outer area of said closure and spaced from said valve member in the other half of its area when the valve member is seated.

6. A valve comprising a body having a passage therethrough, said body having means for holding it in a fluid-conducting member, a rib extending diametrically across the passage, a valve seat within said member around said passage and provided in part by a seat surface on said rib, a pair of disc shaped pivoting valve members each adapted to engage one half of said seat in closed relationship, resilient seal means on one of said seat and valve members engageable between the valve seat and valve members, a hinge member on each of said valve members, said hinge members each having a hole therethrough elongate perpendicular to the plane of the valve members, a shaft through the elongate holes supporting said hinge members and movable therein to the extent of said elongations, means securing the shaft within the body with the shaft overlying said valve members and rib at least in part in a plane perpendicular to the central axis of the passage when the valve members are seated, means on said shaft forcefully contacting said valve members at points in the outer half of the area of each said valve member and spaced from said valve members in the inner half of the area of each valve member when seated and urging the valve member toward a closed position.

7. A valve comprising a body having a passage therethrough, a valve seat within said body around said passage, a pivoting valve member, a seal on the sealing face of said valve member extending around the marginal portion of the sealing surface a short distance from the edge thereof for engagement between the valve seat and valve member in closed relationship, a hinge member on said valve member, said member having a hole therethrough elongate perpendicular to the plane of the valve member for accommodating a shaft in loose engagement to the extent of the elongation, a shaft through the elongate hole supporting said hinge means, means securing the shaft within the body with the shaft overyling said valve member and seat at least in part in a plane perpendicular to the central axis of the passage when said valve member is seated, means on said shaft for contacting said valve member and applying force at a point in the outer half of the area of said valve member and urging the closure toward a closed position, said force applying means spaced from the inner half of the area of said valve member when the valve member is seated.

8. A valve assembly having a passage therethrough, a valve seat surrounding the passage, a valve member for closing off said passage, resilient seal means disposed between the valve seat and the valve member, a floating hinge assembly consisting of a hinge member having means loosely securing it within the assembly allowing limited movement in the direction of fluid flow, said means for securing said hinge member within the assembly positioned to overlie said valve member and seat at least in part in a plane parallel to the central axis of the passageway when the valve member is seated, a force applying means in contact with the valve member at a point in the outer half of the area of said valve member opposite said hinge assembly for urging said valve member toward a seated position, said force applying means spaced from the inner half of the area of said valve member when the valve member is seated.

References Cited in the file of this patent

UNITED STATES PATENTS

| | | |
|---|---|---|
| 345,420 | Eskholme | July 13, 1886 |
| 1,112,117 | Carbis | Sept. 29, 1914 |
| 1,238,878 | Bravo | Sept. 4, 1917 |
| 2,277,295 | Brown | Mar. 24, 1942 |
| 2,930,400 | Wheatley | Mar. 29, 1960 |

FOREIGN PATENTS

| | | |
|---|---|---|
| 6,336 | Great Britain | Nov. 25, 1909 |